Patented Apr. 22, 1941

2,239,440

UNITED STATES PATENT OFFICE

2,239,440

RESINOUS COMPOSITION PREPARED FROM MALONIC DIAMIDE

Gaetano F. D'Alelio, Pittsfield, Mass., assignor to General Electric Company, a corporation of New York No Drawing. Application October 16, 1937,
Serial No. 169,465

13 Claims. (Cl. 260—72)

The present invention relates to resinous compositions and to the production of the same.

This invention is based on the discovery that organic compounds having a methylene group attached to two adjacent carbon atoms, which are at least double-bonded and in turn are each attached to adjacent nitrogen atoms, constitute a class of substances which on reaction with aliphatic aldehydes, e. g. formaldehyde, form light-colored, light-stable resinous products. The grouping of this class of substances may be represented generally as

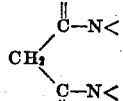

or

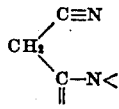

or

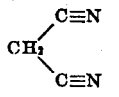

As noted, the carbon atoms adjacent to the methylene group are at least double-bonded, and may be attached either to a double-bonded element, such as oxygen or sulfur, or directly attached to the adjacent nitrogen by means of a triple bond.

Malonic diamide,

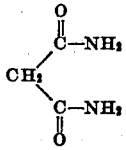

may be considered a typical example of the foregoing class of compounds. Illustrative examples of other organic compounds of the defined class are cyanoacetamide, N,N' diphenyl malonic diamide and methylene cyanide, the formulas for which are given hereafter under Examples 4, 5 and 6, respectively. From the foregoing it will be seen that the organic compounds which are condensed with an aliphatic aldehyde in carrying the present invention into effect may be represented by the graphic formula

where X is a member of the class consisting of

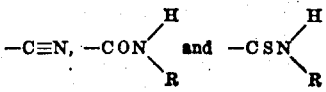

and R is a member of the class consisting of hydrogen and hydrocarbon radicals.

The class of compounds under consideration have been found to react with aliphatic aldehydes, e. g. formaldehyde, in the presence of either alkaline or acid catalysts, or without the presence of a catalyst, to form colorless resins varying from vitreous and semi-vitreous products to fine powders all of which form plastic masses under heat and pressure, and can be molded. In the cured state the resins are resistant to sunlight. They may be produced, therefore, in light colors including the pastel shades.

The condensation reaction may be carried out at room temperature (i. e., about 30° C.) or at elevated temperatures up to the reflux temperature of the aliphatic aldehyde. Various proportions of the aldehyde may be used, for instance, from an amount insufficient to combine with the compound in molecular proportion to an excess of aldehyde. For example, in the case of the condensation of malonic diamide with formaldehyde, 2 to 7 mols of formaldehyde may be employed in the condensation reaction.

The condensation with an alkaline catalyst is preferred inasmuch as immediate reaction takes place between the reactants. With an acid catalyst the time of reaction of the aliphatic aldehyde with the compound is longer.

The condensation products obtained in the reaction of the ingredients, in the presence of an alkaline catalyst, on heat treatment advance in softening point to a stage where they are no longer fusible but are not in the cured state at this point. Addition of an acid material such as, for example, potassium acid sulfate, acetic acid or even an acidic synthetic resin, such as an alkyd resin, or an acidic gum, such as shellac, produces a thermosetting resin which may be cured to the infusible insoluble state.

The products may be obtained with glass clarity if a light-colored acid is used in the cure. Fillers, dyes, pigments, etc., may be incorporated into the resinous mass and may be mixed with the resin either in the syrup stage or in the dehydrated state. The alkaline syrup may be converted to the acid side and moldable sheets prepared by impregnating with it paper, cloth or other fibrous material. Translucent or opaque laminated material may thus be made.

Since the resins are colorless or nearly so and resistant to light, products in the light colors or pastel shades may be prepared.

Moreover, because of the peculiar structure of the compounds it is possible to utilize them in the conversion of fusible phenolic resins to the infusible state. It is to be observed that the condensation products of the class of compounds under consideration and an aliphatic aldehyde give a product having an ethylenic structure. Thus in the case of the condensation of malonic diamide with formaldehyde, the following reaction occurs:

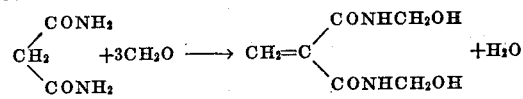

The product of the reaction is in itself not only polymerizable but acts as a catalyst in the conversion of phenol-aldehyde condensation products to the cured or infusible state. Moreover, the products so produced are light-colored and of good light-stability, a truly unexpected result in the case of phenol-aldehyde condensation products which, as heretofore prepared, have not been light-colored or if so, initially, have not been resistant to light.

In order to illustrate the invention the following typical examples are given, it being understood that they are given merely by way of illustration and not by way of limitation of the invention.

*Example I*

25 parts by weight of malonic diamide at room temperature are mixed with 79.3 parts of aqueous formalin solution (37.1% by weight), and 0.25% (calculated on the weight of malonic diamide used) of sodium hydroxide dissolved in about 5 parts by volume of water is slowly added. The solution is allowed to stand from 1 to 24 hours. The solution is then evaporated by the application of heat or heat under vacuum or is evaporated simply under vacuum.

The reaction may be carried out at higher temperatures either by first bringing the malonic diamide and formaldehyde to reflux temperature and then slowly adding the catalyst, or by first mixing all of the ingredients and then raising the temperature.

The final resin is the same, regardless of the amount of formaldehyde used, provided at least 3 mols of formaldehyde are present. That is, the product is tri-methylol malonic diamide, viz:

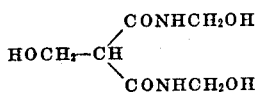

which probably dehydrates through different stages to tri-methylene malonic diamide by the loss of 3 mols of water:

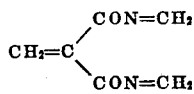

The resinous product produced as above outlined may be used to convert a fusible phenolic resin to the infusible state producing light-colored resinous products. Thus:

A phenolic resin is prepared from redistilled phenol, formaldehyde and a sulfuric acid catalyst. After reaction has taken place between the ingredients for one hour, the water layer is decanted and the resin washed with water to remove as far as practical all traces of the acid. The product then is dehydrated in vacuum (27″) at about 100° C. until it is brittle. A very light-colored, novolak-type resin results.

The following table shows the results of the preparation of several resinous products from the novolak-type resin prepared as outlined above using a malonic diamide-formaldehyde reaction product prepared as also outlined above. The preparation of the following resinous products was effected by processing equal parts by weight of the malonic diamide-formaldehyde reaction product and the washed phenolic resin. The temperature of the malonic diamide-formaldehyde condensation reaction is given in each case as is also the color of the product obtained when equal parts of the malonic diamide-formaldehyde reaction product and phenolic resin are molded at 150° C. for 5 to 10 minutes.

| No. | Percent alk.* | Mol ratio malonic diamide to $CH_2O$ | Temp. of reaction °C. | Reaction product with phenolic resin |
|---|---|---|---|---|
| 1 | 4 | 1:7 | 90 | Reddish pink, clear. |
| 2 | 3 | 1:7 | 90 | Do. |
| 3 | 2 | 1:7 | 90 | Light pink, clear. |
| 4 | 1 | 1:7 | 90 | Do. |
| 5 | None added | 1:7 | 90 | No real cure. |
| 6 | 4 | 1:7 | 50 | Reddish pink, clear. |
| 7 | 1 | 1:7 | 50 | Light yellow pink, clear. |
| 8 | 4 | 1:4 | 50 | Light yellow, opaque. |
| 9 | 1 | 1:4 | 50 | Light cream, opaque. |
| 10 | 4 | 1:4 | 90 | Slight pink cast, clear. |
| 11 | 1 | 1:4 | 90 | Light ivory, opaque. |
| 12 | 1 | 1:3.2 | 50 | Ivory. |
| 13 | 4 | 1:3.2 | 50 | Yellow, opaque. |
| 14 | 1 | 1:4 | Room temp. | Ivory, opaque. |
| 15 | 1 | 1:4 | 90 | Do. |

\* Note.—The percentages of alkali are in addition to the amount required to neutralize the formaldehyde solution.

*Example II*

25 parts by weight of malonic diamide
139 parts by weight of 37% formaldehyde solution are refluxed 12 hours with no added catalyst and then dehydrated under vacuum to a water-white glassy resin, which is soluble in water. This resin can be cured to the infusible state. The addition of acid hastens the cure.

*Example III*

25 parts by weight of malonic diamide
139 parts by weight of formaldehyde solution in
1 part by weight of HCl and
5 parts by volume of water are refluxed 20 hours and dehydrated to a glassy, water-white resin which is soluble in water, and which cures without further addition of acid to the infusible state.

*Example IV*

15 parts by weight of cyanoacetamide

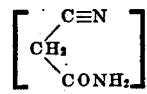

48 parts by weight of formaldehyde solution
0.20 part by weight of sodium hydroxide, in
10 parts by volume of water are mixed in the cold at about 30° C., the temperature rising to about 70° C. An orange-colored solution results. After standing one hour the product is evaporated in an oven at about 70° C. for 10 to 15 hours. The resin may be cured, and in the cured state is insoluble in water, while in the uncured state it is partly dissolved with difficulty in boiling water.

Example V 5 parts by weight N, N' diphenyl malonic diamide

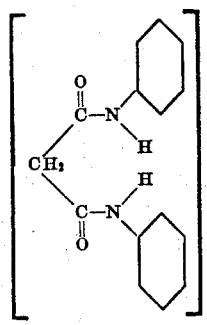

7 parts by weight of formaldehyde solution
0.1 part by weight of sodium hydroxide, in
20 parts by volume of water are refluxed for 75 minutes. A creamy white insoluble resin precipitates out and is filtered off from the water layer. The resin is dried at 70° C. It is insoluble in water and can be cured to an infusible, insoluble state, the addition of acid hastening the time to cure.

Example VI 10 parts by weight of methylene cyanide

40 parts by weight of formaldehyde solution
0.1 part by weight of sodium hydroxide, in
10 parts by volume of water are mixed at room temperature. The reaction starts immediately and the temperature rises to 70° C. The solution is dehydrated for 10 hours at 70° C. in an oven. The resin is amber-colored and in the uncured state is difficultly soluble in hot water. The cured resin is insoluble and infusible.

In addition to the compounds specifically mentioned above by way of example of the class under consideration others may be used. For example, monothio malonic diamide,

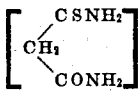

dithio malonic diamide,

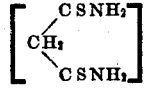

cyanothio acetamide,

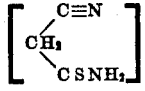

and others may be used as will be apparent to those skilled in the art to which this invention pertains. Moreover, while formaldehyde has been used as illustrative of the alipathic aldehyde, it will be obvious to those skilled in the art that other aliphatic aldehydes may be used, such as acetaldehyde and the like, care being taken in the choice of the aliphatic aldehyde with respect to the color desired in the final product.

As noted in the examples, the condensation may be carried out in the presence of alkaline or acid catalysts, or without any catalysts. In addition to the catalysts mentioned in the examples, the following have been used to produce resinous products similar to those obtained in the examples noted:

1. pyridine
2. ammonium carbonate
3. glycine
4. sodium glycinate
5. triethylene tetramine
6. sodium tetraborate
7. potassium sodium tartrate
8. biguanidine
9. morpholine
10. ammonia
11. sodium carbonate
12. sodium bicarbonate
13. trimethyl amine
14. triethanol amine
15. ethylene diamine
16. lithium carbonate
17. sodium cyanide
18. aniline
19. ammonium acetate
20. secondary ammonium phosphate The dehydration of the resin may be carried out at atmospheric pressures with the application of heat from 50° to 100° C., or at lower temperatures using vacuum.

All of the alkaline resins exhibit hardening or drying tendencies but are actually cured by the addition of substances of an acid nature, e. g. organic acids, such as acetic, oxalic, citric, phthalic anhydride, salicylic acid and the like, or acidic salts, such as sodium acid phosphate, copper sulfate and the like, or acidic resins, such as shellac or acidic synthetic resins, e. g. alkyd type resins. Resinous products prepared with acid catalysts cure without the necessity of any added substances.

The finally cured resins are light-stable and unaffected by most solvents. With fillers, such as wood flour and alpha flock and the application of heat and pressure, the resin may be molded into rigid masses. The filler may be mixed with the dehydrated resin or with the reaction product in the syrupy stage.

As further illustrative of the scope of my invention, the following examples are given of the production of varnishes and laminated products from phenol-aldehyde resins in which the condensation products described herein are used as catalysts and co-polymerizing agents.

Example VII 50 parts by weight distilled water-white phenol
125 parts by weight formaldehyde solution
5 parts by weight malonic diamide-formaldehyde condensation product
0.3 part by weight NaOH, in
5 parts by volume of water The malonic diamide condensation product, alkali and formaldehyde solution are mixed together and then the phenol is added immediately. The mass is refluxed for one hour and dehydrated to 110° C. under 27" vacuum after which an equal amount of alcohol is added. Paper sheets are dipped to a 50% resin content, thereafter being dried in an oven at 70° C. for 35 minutes. The coated and impregnated laminated products are molded at 135° C. for 15 minutes at 2000 lbs. per sq. in. pressure. The molded product is then cooled for 5 minutes. The result is a cured, translucent, almost pure white, laminated product.

Example VIII 50 parts by weight of redistilled water-white phenol
125 parts by weight formaldehyde solution
5 parts by weight of malonic diamide-formaldehyde condensation product
0.3 part by weight NaOH, in
5 parts by volume of water.

The malonic diamide condensation product, formaldehyde and sodium hydroxide are added first and then the phenol is added, the mass is refluxed for one hour and 30 minutes. 58 parts by volume of water are removed and 0.53 part by weight of citric acid hydrate is added. Paper sheets are dipped in the varnish, dried and molded under pressure of 1600 lbs. per square inch at 140° C. for 15 minutes. The varnish in this case is water-white and the molded product is of the same color.

Example IX

Using the same ingredients as in Example VIII the malonic diamide condensation product, formaldehyde and NaOH are mixed and allowed to stand for one hour. The phenol is then added and the mass is refluxed for two hours, 100 parts by volume of water being removed. 0.53 part by weight of citric acid hydrate is added, after which sheets are dipped into the liquid resin and dried at 100° C. for 90 minutes. Products made from this water-white varnish may be molded at 130° C. for one-half hour, utilizing a pressure of 1600 lbs. per sq. in.

Example X 50 parts by weight of redistilled water-white phenol
75 parts by weight of formaldehyde solution
2.5 parts by weight of malonic diamide-formaldehyde condensation product
0.15 part by weight of NaOH, in
5 parts by volume of water The malonic diamide condensation product, formaldehyde and NaOH are mixed and allowed to stand for one hour. The phenol is then added and the solution is refluxed for six hours until a white cloudiness is formed. 0.26 part by weight of citric acid hydrate is added and the mixture is dehydrated until most of the water is removed. 35 parts by weight of ethyl alcohol are added. The varnish is water-white and sheets may be dipped and molded as in the previous examples.

It is to be observed that very light-colored varnishes having good cures and which do not discolor perceptibly at higher temperatures are obtained. Very much lighter products are obtained than are obtained with ordinary alkaline catalysts.

It is found that the varnish is much more stable if the alkali added to the reaction mass is neutralized by the addition of at least the calculated amount of acid. Any substances of an acid nature are satisfactory, e. g. organic acids, such as lactic, oxalic, acetic and the like may be used.

The varnishes remain water-white. Either a shorter reflux may be used in a water medium or a longer reflux may be used in an alcohol medium.

A characteristic of the products is that no sticking of the impregnated sheets is encountered in the mold. Moreover, prolonged exposure to sunlight, for example up to a period of nineteen days, produced practically no change in the color of the laminated sheets. 170 hours of immersion in water at room temperature while exposed to light showed no signs of delamination of the laminated products and also showed low water-absorption even without the addition of water-repellents.

The condensation products of the invention may be utilized instead of substances such as a hexamethylenetetramine in the curing of a phenol-aldehyde resin. The amount of condensation product used determines the speed of cure as well as the color of the cured product. The amount of the condensation product used may be varied and 35 to 50%, for example, of the total weight of the total resinous composition may be used satisfactorily. The condensation product cures the phenolic resin to a very light color and the final product has better light-resistance than phenolic resins cured in the ordinary manner with conversion agents such as hexamethylenetetramine.

As specific illustrations, the following examples are cited:

Example XI 150 parts by weight of malonic diamide and 475.6 parts by weight of 37.1% formaldehyde solution are mixed and made neutral to litmus. 1.5 parts by weight of sodium hydroxide in ten parts by volume of water are added. The solution is then refluxed for one hour, filtered, dehydrated under 27" vacuum to 100° C. until it is no longer tacky when cold.

The resin so prepared may be processed, e. g. by milling with a phenol-aldehyde resin in any manner well known to the art, or by using a specially prepared phenolic resin as illustrated below:

A. 300 parts by weight of phenol
   260 parts by weight of formaldehyde solution
   1.8 parts by weight of concentrated sulphuric acid in 60 parts by weight of H₂O are refluxed for one hour. The resin is washed with additional water until it is neutral to litmus and then dehydrated for three hours to 110° C. under 27" vacuum and further for 7 hours to 150° C. under vacuum.

B. 300 parts by weight of phenol
   258.5 parts by weight of formaldehyde solution
   1.8 parts by weight of concentrated sulfuric acid in 60 parts by weight of water are refluxed for 1 hour. The resin is washed until neutral and then dehydrated for 7 hours to 110° C. under 27" vacuum.

C. 300 parts by weight of phenol
   258.5 parts by weight of formaldehyde solution
   1.8 parts by weight of concentrated sulphuric acid, in
   60 parts by weight of water are refluxed for 1 hour at 110° C.
   5 parts by weight of calcium carbonate are added with stirring and the mass dehydrated at 110° C. and 27" vacuum for 7 hours.

Example XII

A molding resin may be prepared by mixing at 130–150° C. 35 to 50 parts by weight of the resin of Example XI with 50 to 65 parts by weight of the phenolic resin prepared as in Examples XIA, XIB, or XIC. The color of the molded product is light ivory, if the resin is molded by itself. Fillers, such as wood flour, alpha flock and the like, lubricants, dyes, pigments, etc., may be incorporated to give thermosetting resins of good water-resistance.

*Example XIII*

7.5 parts by weight of the same resin as used in Example XII
5.8 parts by weight of alpha flock
1.5 parts by weight zinc stearate
1.5 parts by weight lithopone The whole may be ball milled, sheeted on rolls or processed in a Banbury machine, ground and molded to a white product.

*Example XIV*

10 parts by weight of resin (Example XII)
9 parts by weight alpha flock
1 part by weight lithopone
0.04 part by weight blue toner The above mixture is processed as in Example XIII and gives a stable, blue product.

*Example XV*

125 parts by weight of formaldehyde solution
5 parts by weight malonic diamide condensation product
0.3 part by weight NaOH, in
10 parts by volume of water are mixed and allowed to stand for 1 hour. 50 parts by weight of phenol are added and refluxed from 1 to 4 hours. 50 to 70 parts by weight of alpha flock are added and the mixture dehydrated and molded at 150° C. This illustrates the utilization of a wet-mix process which permits the proportion of the condensation product to be cut down and results in a product of further increased light-resistance.

In addition to the production of laminated products, moldable compositions and molded products, the resinous condensation products may be utilized in conjunction with phenolic resins to produce casting resins and light-colored cast products. Generally, the procedure for preparing the resins is the same as described above, the compositions being dehydrated under vacuum and cast in the usual way.

In my copending application Serial No. 341,531 (a continuation-in-part of the present application), filed June 20, 1940, and assigned to the same assignee as the present invention, I disclosed and broadly claimed compositions comprising a condensation product of a mixture comprising (that is, of ingredients comprising) an aliphatic aldehyde and at least one organic compound having the graphic structure

where X is a member of the class consisting of nitrile radicals, and amide and thioamide radicals having at least one hydrogen atom attached directly to the amide nitrogen, and compositions comprising a condensation product wherein a phenol also is a reactant in addition to an aliphatic aldehyde and the defined methylene-containing organic compound.

What I claim as new and desire to secure by Letters Patent of the United States, is:

1. A resinous composition comprising the product of reaction of an aliphatic aldehyde and malonic diamide.

2. A resinous composition comprising the product of reaction of formaldehyde and malonic diamide.

3. A light-colored resinous composition comprising the product of reaction of phenol-aldehyde condensation product and the product of reaction of formaldehyde and malonic diamide.

4. A composition comprising the resinous product of reaction of a mixture comprising an aliphatic aldehyde and malonic diamide.

5. The method of producing a resinous composition adapted for use as a molding composition, a casting resin or a varnish, said method comprising reacting to resin formation a mixture comprising an aliphatic aldehyde and malonic diamide.

6. A light-colored resinous composition comprising the product of reaction of phenol-aldehyde condensation product and the product of reaction of a mixture comprising an aliphatic aldehyde and malonic diamide.

7. A light-colored molded article produced by molding under heat and pressure a composition comprising the product of reaction of phenol-aldehyde condensation product and the product of reaction of a mixture comprising an aliphatic aldehyde and malonic diamide.

8. A composition as in claim 4 wherein the aliphatic aldehyde reactant is formaldehyde.

9. A composition comprising the alkaline-catalyzed product of reaction set forth in claim 4.

10. A composition comprising the resinous product of reaction of a mixture comprising acetaldehyde and malonic diamide.

11. A composition comprising the resinous reaction product of 1 mol malonic diamide with from 2 to 7 mols formaldehyde.

12. A heat convertible resinous composition comprising a soluble, fusible resinous reaction product of a mixture comprising formaldehyde and malonic diamide.

13. A product comprising the cured resinous composition of claim 12.

GAETANO F. D'ALELIO.